(12) United States Patent
Klostermann et al.

(10) Patent No.: US 12,351,148 B2
(45) Date of Patent: Jul. 8, 2025

(54) METHOD FOR SECURING A VEHICLE

(71) Applicant: ZF CV Systems Global GmbH, Bern (CH)

(72) Inventors: Thilo Klostermann, Barsinghausen (DE); Ruediger Meyer, Hannover (DE); Gerd Roters, Wunstorf (DE); Thomas Schmidt, Hannover (DE); Alexander Wendlandt, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 204 days.

(21) Appl. No.: 18/164,261

(22) Filed: Feb. 3, 2023

(65) Prior Publication Data

US 2023/0182694 A1 Jun. 15, 2023

Related U.S. Application Data

(63) Continuation of application No. PCT/EP2021/070080, filed on Jul. 19, 2021.

(30) Foreign Application Priority Data

Aug. 20, 2020 (DE) .................... 10 2020 121 831.1

(51) Int. Cl.
*B60T 7/12* (2006.01)
*B60T 8/171* (2006.01)

(52) U.S. Cl.
CPC ............... *B60T 7/12* (2013.01); *B60T 8/171* (2013.01); *B60T 2201/024* (2013.01);
(Continued)

(58) Field of Classification Search
CPC ........................... B60T 7/12; B60T 2201/024
See application file for complete search history.

(56) References Cited

U.S. PATENT DOCUMENTS

| | | |
|---|---|---|
| 2010/0318256 A1 | 12/2010 | Breuer et al. |
| 2014/0207352 A1 | 7/2014 | Rossi et al. |

(Continued)

FOREIGN PATENT DOCUMENTS

| | | | |
|---|---|---|---|
| DE | 10 2004 055 399 A1 | 5/2006 | |
| DE | 10 2007 052 439 A1 | 5/2009 | |

(Continued)

OTHER PUBLICATIONS

International Search Report of the European Patent Office dated Oct. 15, 2021 for international application PCT/EP2021/070080 on which this application is based.

(Continued)

*Primary Examiner* — Long T Tran
(74) *Attorney, Agent, or Firm* — Walter Ottesen, P.A.

(57) ABSTRACT

The disclosure relates to a method for securing a vehicle, preferably a commercial vehicle, in an emergency braking situation, wherein the vehicle has a vehicle bus system and a braking system, the method having the following steps: monitoring signals on the vehicle bus system; detecting an emergency brake signal provided by a driver assistance system on the vehicle bus system; ascertaining whether the vehicle is at a standstill; bringing a braking device of the braking system into a braking position if a standstill of the vehicle is ascertained. The disclosure also relates to a control unit for a vehicle, a computer program, a braking system for a vehicle, and a vehicle.

19 Claims, 4 Drawing Sheets

(52) U.S. Cl.
CPC ....... *B60T 2220/00* (2013.01); *B60T 2240/00* (2013.01); *B60T 2250/04* (2013.01)

(56) References Cited

U.S. PATENT DOCUMENTS

| | | | |
|---|---|---|---|
| 2016/0137177 A1* | 5/2016 | Wilhelm | B60T 7/22 |
| | | | 701/70 |
| 2016/0214595 A1* | 7/2016 | Baehrle-Miller | B60T 17/221 |
| 2019/0263423 A1 | 8/2019 | Wakabayashi et al. | |
| 2020/0001866 A1* | 1/2020 | Ross | B62D 15/0285 |
| 2020/0361428 A1* | 11/2020 | Blumentritt | B60T 17/221 |
| 2021/0245704 A1* | 8/2021 | Ricke | B60W 40/12 |

FOREIGN PATENT DOCUMENTS

| | | |
|---|---|---|
| DE | 10 2011 114 072 A1 | 3/2013 |
| DE | 10 2016 207 284 A1 | 11/2017 |
| EP | 2 214 940 B1 | 8/2010 |
| JP | 2013-133072 A | 7/2013 |
| JP | 2015-47948 A | 3/2015 |

OTHER PUBLICATIONS

English translation and Written Opinion of the International Searching Authority dated Oct. 15, 2021 for international application PCT/EP2021/070080 on which this application is based.

* cited by examiner

METHOD FOR SECURING A VEHICLE

CROSS-REFERENCE TO RELATED APPLICATIONS

This application is a continuation application of international patent application PCT/EP2021/070080, filed Jul. 19, 2021, designating the United States and claiming priority from German application 10 2020 121 831.1, filed Aug. 20, 2020, and the entire content of both applications is incorporated herein by reference.

TECHNICAL FIELD

The disclosure relates to a method for securing a vehicle, preferably a commercial vehicle, in an emergency braking situation, wherein the vehicle includes a vehicle bus system and a braking system.

BACKGROUND

To protect the occupants of a vehicle, in particular a commercial vehicle, it is often desirable to brake the vehicle automatically. In particular, it can be helpful to brake the vehicle immediately after an accident, for example to prevent the vehicle from shifting in the event of a further collision or to facilitate the rescue of people involved in an accident. In the event of an accident, rescue teams often face the problem that the vehicle involved in the accident has to be secured before they can start rescuing people, in order to prevent any additional danger to the rescue team. Depending on the loading condition of the vehicle and the accident location, this can take time and may require a large number of helpers, which delays the rescue of accident victims. This problem is particularly pronounced in accidents involving multiple vehicles.

Particularly when commercial vehicles, such as trucks, are involved in an accident, the problem often arises that the driver of the commercial vehicle has to be rescued from a deformed cab. In many cases, the use of hydraulic rescue cylinders is not sufficient, such that the driver's cab of the commercial vehicle has to be pulled apart, wherein prior fixation of the vehicle is essential. Another problem can arise in the recovery of overturned trailers or vehicles if the wheels of the vehicle are released when it is set upright and the vehicle starts to roll after it has been set upright. In particular, rescue workers may be at risk if other aids are used to set the trailer or vehicle upright, such as a crane or winch, which might be carried along by the vehicle.

Furthermore, especially on busy roads, there is a risk of a stationary vehicle being hit by another vehicle and pushed into a third vehicle, thus potentially trapping vehicle occupants.

Modern vehicles are often equipped with emergency braking systems that are configured to detect hazardous situations and, if necessary, to initiate emergency braking of the vehicle. In the course of this emergency braking, the vehicle is then braked to a standstill, wherein the brakes are released once the vehicle is stationary. In order to brake a vehicle even when it is stationary, methods are known which bring a parking brake of the vehicle into a braking position. For example, US 2010/0318256 discloses a method for operating a motor vehicle, including the steps of: detecting whether emergency braking has been performed, if so, detecting whether there is a front vehicle in front of the motor vehicle in a direction of travel of the motor vehicle, if so, detecting whether the motor vehicle is stationary, and, if so, bringing a parking brake into a braking position. A disadvantage of this is that the parking brake is only brought into a braking position when a front vehicle is detected. Furthermore, a detection device for the front vehicle must be present and functional. In many cases, however, a frontal collision damages a corresponding detection device, which means that no front vehicle can be detected when the vehicle is stationary.

DE 10 2007 052 439 A1 discloses a driver assistance system for motor vehicles which has at least one operating data sensor for detecting operating data characterizing the current or future state of movement of the motor vehicle, and an electrical controller which is configured to trigger autonomous emergency braking of the motor vehicle if predetermined operating data are present. It is further provided that the electrical controller is configured to bring a parking brake of the vehicle into an activation position immediately before, during or after an emergency braking, in which a power failure passively brings the parking brake into a braking position. Here too, the controller is directly connected to the operational data sensor, and so functionality cannot be guaranteed if the driver assistance system is damaged in an accident. Both emergency braking and braking when stationary are based on instructions from the electrical controller, so that a failure of the controller is accompanied by a failure of the entire functionality.

SUMMARY

The object of the present disclosure is therefore to specify a method for securing a vehicle which, compared with the prior art, allows improved functionality and safety at preferably lower costs. In particular, a particularly high level of fail-safety is to be achieved.

In a first aspect, the disclosure achieves the above object in the case of a method described at the outset, including the steps of: monitoring signals on the vehicle bus system; detecting an emergency brake signal provided by a driver assistance system on the vehicle bus system; ascertaining whether the vehicle is at a standstill; bringing a braking device of the braking system into a braking position if a standstill of the vehicle is ascertained.

The disclosure is based on the knowledge that signals provided on the vehicle bus system can be detected by a plurality of devices or modules of the vehicle connected to the vehicle bus system. Vehicle bus systems are characterized in that a transmission of data and/or signals between several participants is carried out via a common transmission path. Here, several systems can also receive the signal provided by a driver assistance system on the bus system. If the driver assistance system now provides the emergency brake signal on the vehicle bus system, this emergency brake signal can also be detected by one or more systems or elements that monitor the vehicle bus system. This can advantageously provide redundancy. For example, a braking device of the braking system can be brought into a braking position by means of another system and/or module even if the driver assistance system is damaged. Furthermore, the braking device of the braking system can be brought into the braking position when the vehicle is stationary and the driver assistance system is not configured to bring the braking device into the braking position when the vehicle is stationary. The method according to the disclosure is therefore also particularly suitable for being carried out by means of retrofitted systems and/or modules. However, it can also be provided that the method is carried out by means of an existing system and/or an existing component of the vehicle, in particular the braking system.

Preferably, monitoring signals of the vehicle bus system includes receiving a signal provided on the vehicle bus system. Furthermore, monitoring preferably includes identifying the signals provided on the vehicle bus system. For example, it is thus possible to ascertain whether the signal provided on the vehicle bus system is an emergency brake signal or another signal, such as an airbag signal. Particularly preferably, monitoring signals on the vehicle bus system includes ascertaining a checksum and/or a counter identifying the signal provided on the vehicle bus system. Preferably, detecting an emergency brake signal provided by a driver assistance system on the vehicle bus system then includes comparing the ascertained checksum and/or the ascertained counter with a predefined safety checksum and/or a predefined safety counter, wherein the emergency brake signal is detected if the ascertained checksum of the signal matches the predefined safety checksum and/or if the ascertained counter of the signal matches the safety counter. Preferably, the monitoring of signals on the vehicle bus system and the detection of an emergency brake signal is performed by a brake control unit of the braking system. However, it may also be provided that the monitoring of signals on the vehicle bus system and the detection of an emergency brake signal is alternatively or redundantly performed by a hand brake control unit, particularly preferably a hand brake control unit of an electro-pneumatic hand brake. Preferably, the hand brake control unit and the brake control unit may also interact for monitoring and/or detection. A possibly negative interaction with an emergency braking of the vehicle can be avoided by bringing the braking device of the braking system into the braking position only if a standstill of the vehicle is ascertained.

In a first preferred embodiment, in the event that a standstill of the vehicle is not ascertained, the method includes: ascertaining whether a manual user specification is provided; bringing the braking device of the braking system into the braking position if the provision of the manual user specification is not ascertained. The case that a standstill of the vehicle is not ascertained can have several possible causes. For example, an emergency braking situation due to which the emergency brake signal is provided might not cause the vehicle to brake completely. This is the case, for example, if a vehicle in front decelerates only briefly and then continues a journey, so that the vehicle behind does not have to brake completely either. If the journey is continued following the provision of an emergency brake signal, a user specification is provided on the vehicle bus system and can, for example, be a drive signal provided on the vehicle bus system by actuating an accelerator pedal of the vehicle. If a drive signal remains absent, this indicates an emergency situation, so that bringing the braking device into the braking position can be useful even if no standstill of the vehicle is ascertained. Preferably, the braking device of the braking system is brought into the braking position if the manual user specification is not provided for a predefined period of time. Preferably, the period of time is measured starting from an ascertainment of the emergency brake signal.

In a preferred embodiment, the step of ascertainment of whether the vehicle is at a standstill includes: detecting a wheel speed signal provided by a wheel speed sensor and/or a central module on the vehicle bus system; evaluating the wheel speed signal; and ascertaining the standstill of the vehicle if a value of the speed falls below a predefined speed limit value, preferably for a predefined period of time. Preferably, the step of ascertaining whether the vehicle is at a standstill may include: detecting an acceleration signal provided by an acceleration sensor on the vehicle bus system; evaluating the acceleration signal; and ascertaining if the vehicle is at a standstill when an acceleration value represents a standstill of the vehicle, preferably for a predetermined period of time. For example, the absence of a positive and/or negative acceleration value may represent a standstill of the vehicle.

Preferably, the wheel speed signal is evaluated with a module that also monitors the vehicle bus system. However, it is also possible for the wheel speed sensor to evaluate the wheel speed signal and ascertain whether the vehicle is at a standstill. If necessary, the wheel speed sensor is then configured to provide a standstill signal on the vehicle bus system. Preferably, in the event that a wheel speed signal is not provided, the method includes: bringing the braking device of the braking system into the braking position when a period of time since a wheel speed signal was last provided exceeds a predefined wheel speed time limit value. Preferably, the ascertainment of the standstill of the vehicle can occur when the value of the speed falls below the predefined speed limit value, preferably for a predefined period of time, and an acceleration value ascertained in a predefined period of time prior to the detection of the wheel speed signal exceeds a predefined acceleration limit value. For example, it is typical in vehicle accidents that a wheel standstill follows a sharp deceleration of the vehicle. Preferably, ascertaining whether the vehicle is at a standstill can alternatively or additionally also be performed by means of detecting a speedometer signal, evaluating the speedometer signal and ascertaining a standstill of the vehicle if the speedometer signal falls below a predefined speedometer limit value.

Preferably, the method further includes: ascertaining an absence of the emergency brake signal, and ascertaining whether the absence of the emergency brake signal is in response to an emergency brake termination signal provided by the driver assistance system for terminating emergency braking of the vehicle.

It shall be understood that the emergency brake termination signal need not be a separate signal. Likewise, the emergency brake termination signal may be a part of the emergency brake signal. Preferably, the emergency brake signal has an emergency brake termination signal, wherein the emergency brake termination signal identifies a correct end of the emergency brake signal. Preferably, the emergency brake termination signal is a predefined termination bit and/or a predefined termination bit sequence of the emergency brake signal. For example, the emergency brake termination signal may be a termination bit sequence of seven consecutive recessive bits. Here, the emergency brake termination signal identifies the emergency brake signal in such a way that emergency braking is to be terminated. This may be the case, for example, when emergency braking is no longer required or when the vehicle is at a standstill. If emergency braking is no longer present and the emergency brake termination signal is absent, then this indicates damage to the driver assistance system. For example, the driver assistance system may be damaged or destroyed, wherein it also no longer provides an emergency brake signal on the vehicle bus system. In particular, since driver assistance systems are often located at the front of a vehicle, they are often destroyed when the vehicle collides with an obstacle. Even after the driver assistance system has been destroyed, however, it may still be necessary to brake the vehicle, wherein for this purpose it is preferably ascertained whether the absence of the emergency brake signal is in response to an emergency brake termination signal.

Preferably, the method further includes: ascertaining a time span between detecting the emergency brake signal and ascertaining the absence of the emergency brake signal, in the event that the absence of the emergency brake signal is not in response to an emergency brake termination signal; comparing the time span to a predefined time limit value; and performing at least one follow-up operation if the time span exceeds the predefined time limit value. If a vehicle is involved in an accident, a certain minimum time interval represented by the time limit value elapses between a first detection of the emergency brake signal and an absence of the emergency brake signal caused by the actual collision. If the time span that elapses between the detection of the emergency brake signal and the absence of the emergency brake signal is less than this time limit value, the absence of the emergency brake signal is very unlikely to be due to an accident involving the vehicle. An early or unnecessary execution of the follow-up operation can therefore be avoided by means of comparing the time span with the time limit value. For example, a further driver assistance system can be configured to brake the vehicle to a standstill during an accident, even if the emergency braking system is damaged. A follow-up operation is preferably to be performed only after this so-called "in-crash" braking has been completed, for which purpose a pre-known minimum time interval is usually required, which then defines the time limit value. It may further be provided that the time limit value is defined using further parameters.

In various embodiments, the follow-up operation includes: bringing the braking device of the braking system into the braking position for braking the vehicle to a standstill, if a standstill of the vehicle is not ascertained, and holding the braking device in the braking position, subsequently to braking the vehicle to a standstill. If the driver assistance system is damaged or destroyed in an accident, then an emergency brake signal is no longer provided on the vehicle bus system. The vehicle may still be in motion, so braking of the vehicle may still be desirable to prevent further collisions. The follow-up operation therefore preferably involves braking the vehicle to a standstill. In this way, redundancy of the driver assistance system can be achieved in a preferred manner. Braking of the vehicle is thus possible even if the driver assistance system is destroyed and no longer provides an emergency brake signal. Furthermore, the vehicle continues to be braked after braking until it comes to a standstill, making it easier to secure the vehicle and/or rescue people who have been involved in an accident.

Preferably, the follow-up operation can include: bringing the braking device of the braking system into the braking position when ascertainment of the standstill of the vehicle is impossible. For example, ascertainment of the standstill of the vehicle may be impossible if the wheel speed sensor or the wheel speed sensors are damaged and/or if the vehicle bus system is interrupted. Even in such cases, braking of the vehicle should preferably be possible.

According to an embodiment, the method further includes: detecting a drive signal subsequently to bringing the braking device of the braking system into the braking position; and bringing the braking device of the braking system into a driving position in response to the detection of the drive signal. In many cases, it may be necessary to move vehicles involved in an accident as part of a recovery operation. For example, if the driver of a commercial vehicle is trapped in the driver's cab, it may be necessary to separate two vehicles that are wedged together to allow recovery of the driver. In order to release the braking device of the braking system, which has been brought into the braking position, and to allow the vehicle to be moved, provision is preferably made for bringing the braking device of the braking system into a driving position. According to the disclosure, this is done by detecting the drive signal, wherein the drive signal is preferably provided by an accelerator pedal of the vehicle. Furthermore, the braking device of the braking system may also have been brought into the braking position without the vehicle having been involved in an accident. For example, an accident may have been prevented by the emergency braking of the vehicle. If travel of the vehicle is to be continued, the driver of the vehicle may provide the driving signal, wherein the braking device is brought into the driving position and the vehicle may be moved again. Preferably, the drive signal can also be provided by means of a release device mounted externally on the vehicle and/or by a central control unit of the vehicle.

Preferably, the vehicle bus system is a CAN bus system. CAN bus systems are widely used for all common vehicle types, so that the method can preferably be applied to a particularly large number of vehicles. Further preferably, the vehicle bus system can also be a CAN FD bus system, a LIN bus system, an SAE J1939 bus system, a FlexRay bus system, a MOST bus system or a K-Line bus system.

In a preferred embodiment of the method, the driver assistance system is an autonomous emergency braking system of the vehicle. Such autonomous emergency braking systems preferably have at least one radar unit configured to detect a path of travel ahead of the vehicle in the direction of travel. In the event of an accident involving the vehicle, such a radar unit is frequently damaged, and so the method provides particularly good redundancy if the driver assistance system is an autonomous emergency braking system of the vehicle.

Preferably, the braking device is a parking brake or a service brake of the braking system. It is particularly advantageous that a parking brake is generally configured to brake the vehicle permanently, for example even when no brake signal is provided. For example, commercial vehicles often have so-called spring-loaded brakes, wherein a preloaded spring brakes the vehicle even if no hydraulic or pneumatic brake pressure and/or no brake signal is provided. However, it is also possible for the braking device to be an electronic handbrake and/or a magnetic brake.

According to a second aspect, the disclosure solves the problem described at the outset with a control unit for a vehicle including means suitable for carrying out the steps of a method according to the first aspect of the disclosure. Preferably, the control unit is a main control unit of a braking system of the vehicle. However, it may also be provided that the control unit is a separate control unit intended only to carry out the method according to the first aspect of the disclosure. This is particularly desirable if a particularly high level of redundancy is to be achieved.

According to a third aspect, the disclosure solves the problem described at the outset with a computer program including instructions that cause the control unit according to the second aspect of the disclosure to carry out the method according to the first aspect of the disclosure when the computer program is run on a computing unit. The computing unit is preferably a computing unit of the control unit according to the second aspect of the disclosure.

In a fourth aspect, the disclosure solves the problem described at the outset with a braking system for a vehicle, in particular a commercial vehicle, including a control unit according to the second aspect of the disclosure. Preferably, the braking system includes a trailer braking circuit for a trailer of the vehicle, wherein the braking device particularly preferably includes a braking device of the trailer braking circuit.

In a fifth aspect, the aforementioned problem is solved with a vehicle, preferably a commercial vehicle, including a braking system according to the fourth aspect of the disclosure.

It is to be understood that the method according to the first aspect of the disclosure, the control unit according to the second aspect of the disclosure, the computer program according to the third aspect of the disclosure, the braking system according to the fourth aspect of the disclosure and the vehicle according to the fifth aspect of the disclosure can have the same and/or similar sub-aspects. In this respect, reference is made in full to the above description relating to the first aspect of the disclosure for further embodiments of the control unit, the computer program, the braking system and the vehicle and their advantages.

BRIEF DESCRIPTION OF DRAWINGS

The invention will now be described with reference to the drawings wherein.

DETAILED DESCRIPTION

Figure 1:
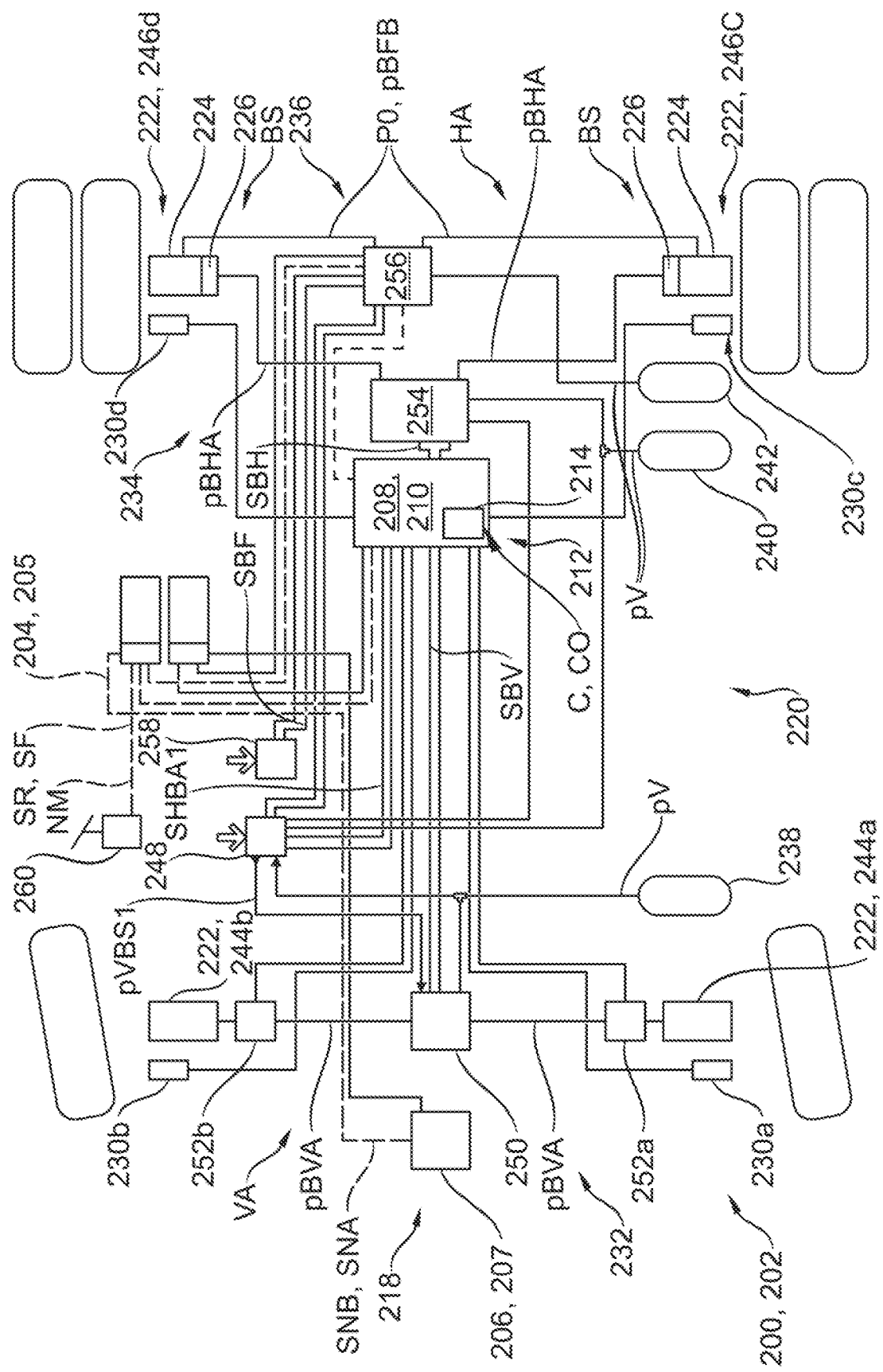
FIG. 1 shows a vehicle according to a first embodiment with a braking system and a driver assistance system.

FIG. 1 shows a vehicle 200, which here is a commercial vehicle 202. The vehicle 200 has a braking system 220, which has a front axle brake circuit 232 for a front axle VA and a rear axle brake circuit 234 for a rear axle HA of the vehicle 200. A parking brake circuit 236 is further provided for the rear axle HA. The front axle brake circuit 232 is fed from a first compressed air supply 238, the rear axle brake circuit 234 is fed from a second compressed air supply 240, and the parking brake circuit 236 is fed from a third compressed air supply 242. The first compressed air supply 238 and also the second compressed air supply 240 and the third compressed air supply 242 provide a supply pressure pV. Alternatively, it can be provided that the parking brake circuit 236 is also supplied by the first compressed air supply 238 and/or the second compressed air supply 240. The braking system 220 has a plurality of braking devices 222. Here, the braking devices 222 include first and second front axle brake actuators 244a, 244b on the front axle VA and two rear axle brake actuators 246c, 246d on the rear axle HA. The rear axle brake actuators 246c, 246d are configured as so-called tristop brake cylinders and can act as both service brakes 226 and parking brakes 224 by having a spring brake cylinder.

The braking system 220 has a brake value transmitter 248 that is connected to both the first compressed air supply 238 and the second compressed air supply 240. The brake value transmitter 248 is configured as a so-called 1P2E brake value transmitter and, in addition to a pneumatic output, also has two electrical outputs. When actuated, the brake value transmitter 248 provides a first front axle brake control pressure pVBS1 at the pneumatic output and a first rear axle brake request signal SHBA1 at a first electrical connection. The first front axle brake control pressure pVBS1 is then provided at a front axle modulator 250, which then volume boosts the first front axle brake control pressure pVBS1 and, based thereon, controls a front axle brake pressure pBVA for the first and second front axle brake actuators 244a, 244b. In order to achieve wheel-appropriate braking, first and second front axle ABS valves 252a, 252b are provided between the front axle modulator 250 and the first and second front axle brake actuators 244a, 244b, respectively, and are electrically connected to a central module 208 so as to be switched by the central module 208. The central module 208 is further connected in a known manner to wheel speed sensors 230a, 230b, 230c, 230d.

Here, the rear axle brake circuit 234 is electrically controlled by means of the central module 208, which receives the rear axle brake request signal SHBA1 provided by the brake value transmitter 248 and provides a corresponding rear axle brake signal SBH to a rear axle modulator 254. Based on the rear axle brake signal SBH, the rear axle modulator 254 then controls a corresponding rear axle brake pressure pBHA at the respective service brakes 226 of the rear axle brake actuators 246c, 246d. Further, the central module 208 may also provide a front axle brake signal SBV to the front axle modulator 250, wherein the front axle modulator 250 is configured to control a front axle brake pressure pBVA corresponding to the front axle brake signal SBV.

A parking brake module 256 of the parking brake circuit 236 is connected to both the brake value transmitter 248 and a parking brake value transmitter 258. Further, the parking brake module 256 is also connected to the central module 208. When one of the elements connected to the parking brake module 256, such as the parking brake value transmitter 258 as an example here, provides a corresponding parking brake signal SBF, the parking brake module 256 controls a parking brake pressure pBFB. In addition, the parking brake module 256 is configured to bleed spring accumulators of the parking brakes 224, thereby placing the parking brakes 224 in a braking position BS. For bleeding, the parking brake module 256 connects the spring accumulators of the parking brakes 224 to a pressure sink, preferably the surrounding environment, and thus provides a bleed pressure p0.

Furthermore, the vehicle 200 is equipped with a driver assistance system 206. Here, the driver assistance system 206 is an emergency braking system 207 arranged at a vehicle front 218. For detecting a driving area of the vehicle 200 located in front of the vehicle front 218, the emergency braking system 207 includes a radar system, not shown further. The emergency braking system 207 is configured to ascertain whether an emergency braking situation NB exists in which the vehicle 200 must be decelerated, and to provide an emergency brake signal SNB if necessary. For example, if the emergency braking system 207 ascertains an obstacle (not shown) appearing in front of the vehicle 200 and it is no longer possible for the vehicle 200 to avoid it, this is ascertained by the emergency braking system 207, wherein this then provides the emergency brake signal SNB.

The driver assistance system 206 is connected to the central module 208 and the parking brake module 256 by means of a vehicle bus system 204, which is here a CAN bus system 205. The vehicle bus system 204 is a system for transmitting data and/or signals between a plurality of units connected to the vehicle bus system 204, wherein a common transmission path is used. Thus, the emergency brake signal SNB provided by the emergency braking system 207 can be detected here by the central module 208 and the parking brake module 256. Furthermore, there is also a connection of the vehicle bus system 204 between the parking brake module 256 and the central module 208. It is to be understood that other units of the vehicle 200 and in particular the braking system 220 may also be connected to the vehicle bus system 204. For example, a steering angle sensor, not shown, or an electronic steering system could be connected to the vehicle bus system 204. In this embodiment, a wheel speed signal SR is also provided on the vehicle bus system 204 by means of the central module 208.

If the driver assistance system 206 now provides an emergency brake signal SNB on the vehicle bus system 204, this is detected by the central module 208. In response, the central module 208 provides the front axle brake signal SBV to the front axle modulator 250 and the rear axle brake signal SBH to the rear axle modulator 254. In response, the modulators 250, 254 output the brake pressures pBVA, pBHA and the vehicle 200 is braked. If emergency braking of the vehicle 200 is no longer required, for example when the vehicle 200 is at a standstill H or there is no longer an obstacle, the driver assistance system 206 provides an emergency brake termination signal SNA on the vehicle bus system 204. Braking of the vehicle 200 is then terminated. Driver assistance systems 206 configured to perform such emergency braking BN are sufficiently known. It is critical here, however, that braking of the vehicle 200 only takes place until the vehicle comes to a standstill H and the braking devices 222 are thereupon released. Furthermore, the driver assistance system 206 is arranged at the exposed vehicle front 218, as a result of which the driver assistance system may be damaged and/or destroyed if the vehicle 200 is involved in an accident. If the emergency braking system 207 is destroyed in an accident, the emergency brake signal SNB is also no longer provided and emergency braking BN of the vehicle 200 is no longer possible.

Figure 2:
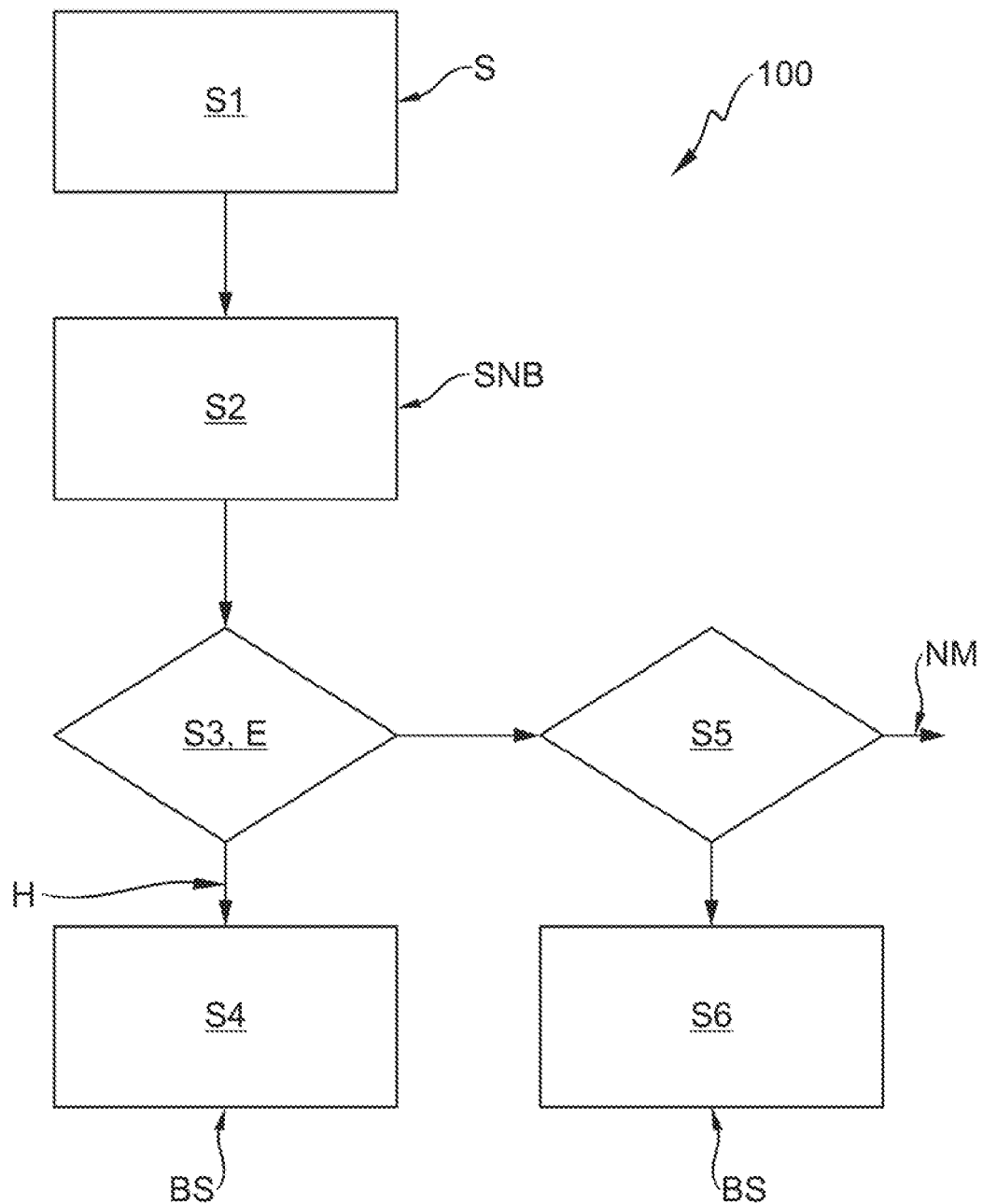
FIG. 2 shows a schematic diagram representing the steps of a first embodiment of the method according to the disclosure.

FIG. 2 now illustrates the steps of a first embodiment of a method 100 according to the disclosure for securing a vehicle 200. In a first step S1, signals S on the vehicle bus system 204 are monitored. This monitoring of signals S is performed here by the central module 208, which is or includes here a control unit 210 according to the disclosure. However, it may equally be provided that the monitoring of signals S is performed by a separate control unit 210 and/or one of the modulators 250, 256. The central module has a computing unit 214 configured to execute instructions CO of a computer program C. When the computer program C is run on the computing unit 214, means 212 of the control unit 210 preferably perform the steps of the method 100 according to the disclosure.

FIG. 2 now illustrates the steps of a first embodiment of a method 100 according to the disclosure for securing a vehicle 200. In a first step S1, signals S on the vehicle bus system 204 are monitored. This monitoring of signals S is performed here by the central module 208, which is or includes here a control unit 210 according to the disclosure. However, it may equally be provided that the monitoring of signals S is performed by a separate control unit 210 and/or one of the modulators 250, 254. The central module has a computing unit 214 configured to execute instructions CO of a computer program C. When the computer program C is run on the computing unit 214, means 212 of the control unit 210 preferably perform the steps of the method 100 according to the disclosure.

If an emergency braking situation NB exists, the driver assistance system 206 provides the emergency brake signal SNB on the vehicle bus system 204. The emergency brake signal SNB may then be detected on the vehicle bus system 204 in a second step S2. In response to detecting the emergency brake signal SNB, the control unit 210 ascertains in a third step S3 whether the vehicle 200 is at a standstill H. The ascertainment E of a standstill H of the vehicle 200 will be explained in detail later. If it is ascertained that the vehicle 200 is at a standstill H, then in a subsequent fourth step S4, a braking device 222 of the braking system 200 is brought into a braking position BS. In this embodiment, for this purpose a bleed signal SO is provided to the rear axle modulator 254 by the central module 208. The latter then bleeds the spring energy accumulators to the ambient pressure p0, which brings the parking brake 224 into the braking position BS. Since spring-loaded brakes are placed in the braking position BS in a depressurized state, a particularly high level of fail-safety can be achieved.

If the ascertainment E indicates that there is no standstill H of the vehicle, a fifth step S5 ascertains whether a manual user specification NM is provided. Such a manual user specification NM may be provided, for example, by an accelerator pedal 260 on the vehicle bus system 204 or by means of another line (not shown). Further, the manual user specification NM could also be provided by means of the brake value transmitter 248. When a manual user specification NM is provided by the driver of the vehicle 200, it can be concluded that the driver is uninjured and the emergency braking situation NB has been handled. It is then not necessary to bring the braking device 222 of the braking system 200 into the braking position BS, and a journey of the vehicle 200 can continue.

On the other hand, if no manual user specification NM is ascertained after ascertainment E of an emergency brake signal SNB and when the vehicle 200 is not at a standstill H, then this is a strong indication that an emergency braking situation NB exists. Therefore, in a sixth step S6, the braking device 222 may be brought into the braking position BS even if no standstill H of the vehicle 200 is ascertained.

Figure 3:
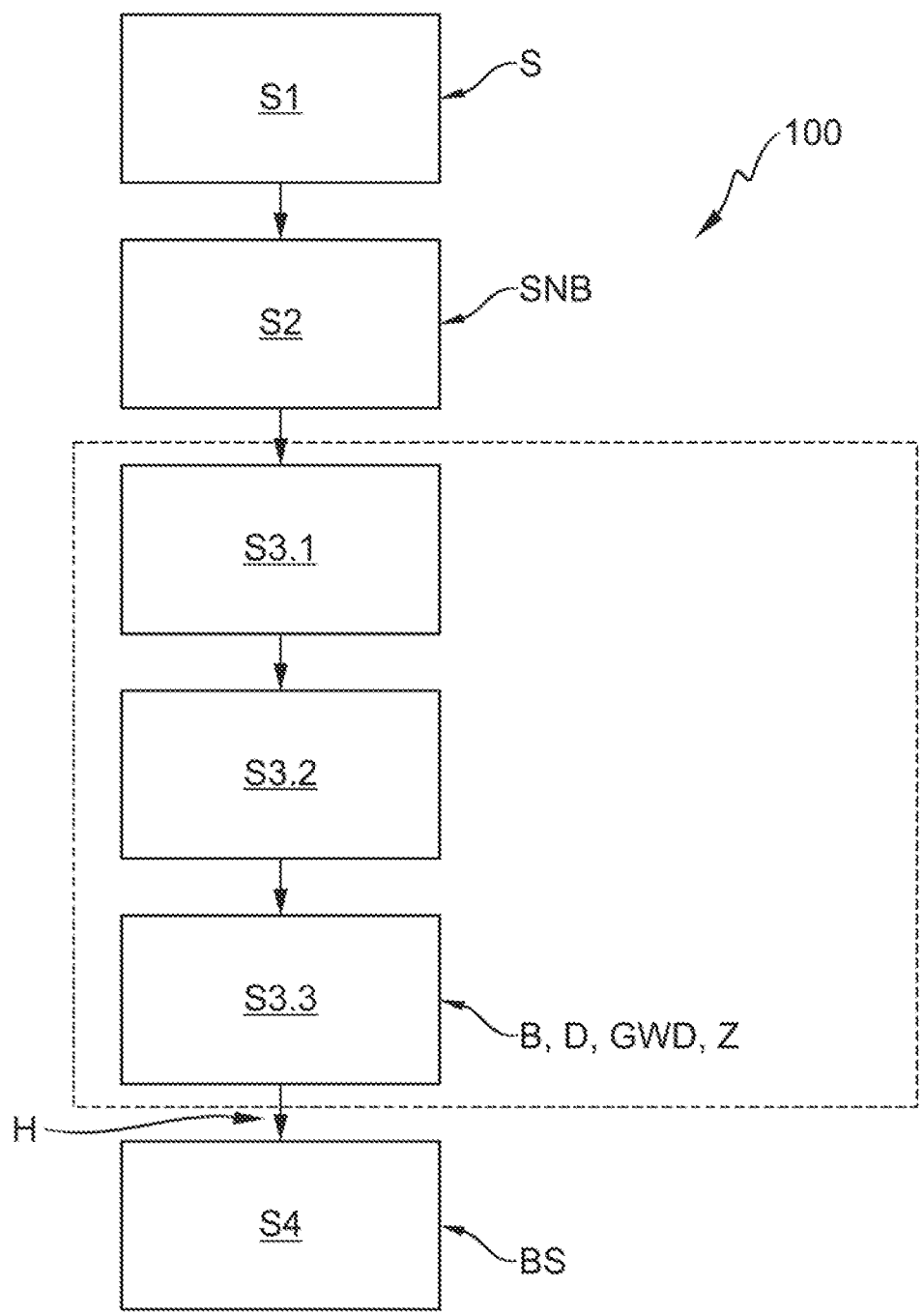
FIG. 3 shows a schematic diagram further illustrating an ascertainment of whether a vehicle is at a standstill; and, FIG. 4 shows a schematic diagram representing the steps of a second embodiment of the method according to the disclosure.

FIG. 3 further illustrates the ascertainment E of whether the vehicle 200 is at a standstill H. After monitoring signals S on the vehicle bus system 204 (step S1) and detecting the emergency brake signal SNB (step S2), the wheel speed signal SR is detected in a first sub-step S3.1. Here, the wheel speed sensors 230 provide signal values to the central module 208, which in turn provides the wheel speed signal SR. Equally, however, the wheel speed signal SR could also be provided by a separate control unit 210 and/or by the wheel speed sensors 230.

In a second sub-step S3.2 of ascertainment E, the wheel speed signal SR is evaluated. During evaluation, a value B of the speed D is ascertained. A value B of the speed can also be considered over a period of time. Subsequently, in a third sub-step S3.3, the ascertained value B of the speed D is compared with a predefined speed limit value GWD. It is particularly useful to consider the value B of the speed D because the vehicle 200 can also be in reverse with a negative value of the speed D. Preferably, when evaluating from the wheel speed signal SR, a speed of the vehicle 200 is ascertained. However, the wheel speed signal SR can also already include corresponding speed information.

If the value B of the speed D falls below the predefined speed limit value GWD, then a standstill H of the vehicle 200 is ascertained. Preferably, the speed limit value GWD has a value of zero. However, it may also be provided that the speed limit value is greater than zero. For example, a braking device 222 of the braking system 220 can be brought into the braking position BS even if the vehicle 200 is moving at only moderate speed (for example, <=3 km/h) and thus there is little or no risk of skidding of the vehicle 200 due to braking.

Preferably, a standstill H is ascertained only when the speed limit value GWD is undershot for a predetermined period of time Z. This prevents a brief locking of one or more wheels of the vehicle 200 from being incorrectly interpreted as a standstill H of the vehicle 200.

Depending on the result of the ascertainment E, steps S5 or S6 are subsequently carried out (in FIG. 3, only the case of a positive ascertainment of the standstill H is shown). It is to be understood that the ascertainment E can preferably also be performed continuously and/or in parallel with other steps of the method 100.

Figure 4:
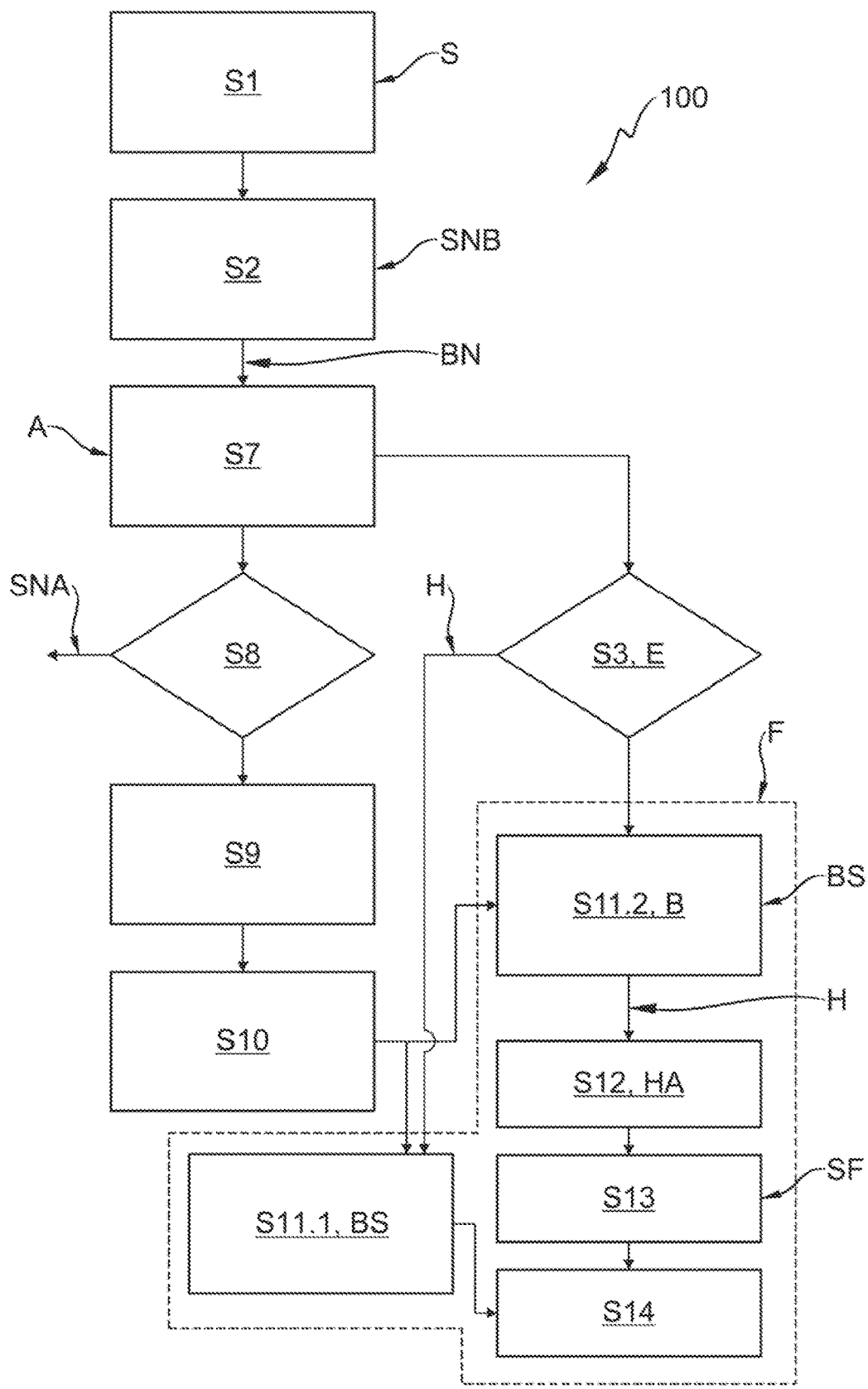

FIG. 4 illustrates the steps of the method according to the disclosure according to a second embodiment. First, signals S on the vehicle bus system 204 are also monitored according to the second embodiment (step S1). If, in a manner analogous to the first embodiment (FIG. 2), an emergency braking situation NB is present and an emergency brake signal SNB is provided on the vehicle bus system 204, then this emergency brake signal SNB is detected in the second step S2. Based on the present emergency brake signal SNB, the vehicle 200 performs an emergency braking BN. In a seventh step S7, an absence A of the emergency brake signal SNB is ascertained. Such an absence A may have several possible causes. For example, the emergency braking situation NB may have been handled, such that the driver assistance system 206 no longer provides an emergency brake signal SNB. However, it is equally possible that providing the emergency brake signal SNB on the vehicle bus system 204 is no longer possible. This is the case, for example, if the vehicle 200 has been involved in a head-on collision in which the driver assistance system 206 arranged at the front of the vehicle 218 has been damaged.

Therefore, in an eighth step S8, it is ascertained whether the absence A of the emergency brake signal SNB is in response to an emergency brake termination signal SNA provided by the driver assistance system 206 for terminating the emergency braking BN of the vehicle 200. If the emergency braking BN is to be terminated in a regular manner, the driver assistance system 206 provides the emergency braking termination signal SNA and a journey of the vehicle 200 may be continued, if necessary. Here, the emergency brake termination signal SNA may also be a component of the emergency brake signal SNB.

Also according to the second embodiment of the method 100, the ascertainment E of whether the vehicle 200 is at standstill H is performed. Preferably, as shown in FIG. 4, this is performed following the absence A of the emergency brake signal SNB. However, it may also be provided that the ascertainment E is performed continuously or at regular time intervals.

If step S8 indicates that the absence A of the emergency brake signal SNB is not in response to an emergency brake termination signal SNA, a ninth step S9 ascertains a time span Δt between the detection of the emergency brake signal SNB and the ascertainment of the absence A of the emergency brake signal SNB. Preferably, this time span Δt is ascertained by the central module 208. In a subsequent tenth step S10, the time span Δt is compared with a predefined time limit value GWZ. If the time span Δt is smaller than the time limit value GWZ, no further steps are performed according to this embodiment.

If the time span Δt exceeds the time limit value GWZ, a follow-up operation F is performed. By comparing the time span Δt with the time limit value GWZ, it can be avoided that the follow-up operation F is performed if the emergency brake signal SNB was provided unintentionally or if the emergency braking situation NB was handled very quickly. Unintentional provision of the emergency brake signal SNB may be caused, for example, by a loose contact at the driver assistance system 206 or by interference signals on the vehicle bus system 204. Further, the time limit value GWZ may also be selected to allow another system of the vehicle 200 to perform an operation first. FIG. 4 shows two possible variants of a follow-up operation F. The first variant is preferably performed when a standstill H of the vehicle 200 is ascertained. In this first variant, the follow-up operation F then consists of bringing the braking device 222 into the braking position BS (step S11.1).

If the ascertainment E does not result in a standstill H of the vehicle 200, the follow-up operation F has an eleventh step S11.2 and a twelfth step S12. In the eleventh step S11.2, the braking device 222 is brought into the braking position BS even though the vehicle 200 is not at a standstill H. Here, the vehicle 200 is braked and the value B of the speed D is monitored at the same time. In this case, the vehicle 200 is braked until the vehicle 200 is at a standstill H. Subsequently, the braking device 222 is held in the braking position BS in the twelfth step S12. Furthermore, the follow-up operation F may also include other steps. For example, in a thirteenth step S13, it may be ascertained whether a drive signal SF is provided after the braking device 222 is brought into the braking position BS. Such a drive signal SF may be provided, for example, by a rescuer or the driver of the vehicle 200 using the accelerator pedal 260. In response to ascertaining a drive signal SF, the braking device 222 may then preferably be brought into a driving position FS (step S14).

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

100 method
200 vehicle
202 commercial vehicle
204 vehicle bus system
205 CAN bus system
206 driver assistance system
207 emergency braking system
208 central module
210 control unit
212 means for carrying out the method
214 computing unit
220 braking system
222 braking device
224 parking brake
226 service brake
230, 230a, 230b, 230c, 230d wheel speed sensor
232 front axle brake circuit
234 rear axle brake circuit
236 parking brake circuit
238 first compressed air supply
240 second compressed air supply
242 third compressed air supply
244a, 244b front axle brake actuators
246c, 246d rear axle brake actuators
248 brake value transmitter 250 front axle modulator
252a, 252b front axle ABS valves
254 rear axle modulator
256 parking brake module
258 parking brake value transmitter
260 accelerator pedal
A absence
HA rear axle
VA front axle
B value
BN emergency braking
BS braking position
C computer program
CO instructions
D speed
E ascertainment
F follow-up operation
FS driving position
GWD speed limit value
GWZ time limit value
H standstill
NB emergency braking situation
NM user specification
pBFB parking brake pressure
pBHA rear axle brake pressure
pBVA front axle brake pressure
pV supply pressure
pVBS1 front axle brake control pressure
p0 bleed pressure
S signal
SBF parking brake signal
SBH rear axle brake signal
SBV front axle brake signal
SF driving signal
SHBA1 rear axle brake request signal
SNA emergency brake termination signal
SNB emergency brake signal
SR wheel speed signal
S0 bleed signal
S1, S2, S3, S3.1, S3.2, S3.3, S4, steps
S5, S6, S7, S8, S9, S10, S11.1,
S11.2, S12, S13, S14
Δt time span
Z period of time

The invention claimed is:

1. A method for securing a vehicle in an emergency braking situation, wherein the vehicle includes a vehicle bus system and a braking system, the method comprising:
monitoring signals on the vehicle bus system;
detecting an emergency brake signal provided by a driver assistance system on the vehicle bus system;
ascertaining whether the vehicle is at a standstill; and,
bringing a braking device of the braking system into a braking position if a standstill of the vehicle is ascertained.

2. The method of claim 1, wherein, in an event that a standstill of the vehicle is not ascertained, the method further comprises:
ascertaining whether a manual user specification is provided; and,
bringing the braking device of the braking system into the braking position if the provision of the manual user specification is not ascertained.

3. The method of claim 1, wherein said ascertaining whether the vehicle is at the standstill comprises:
detecting a wheel speed signal provided by a wheel speed sensor or a central module on the vehicle bus system;
evaluating the wheel speed signal; and
ascertaining the standstill of the vehicle if a value of a speed falls below a predefined speed limit value.

4. The method of claim 3, wherein the standstill is ascertained when the speed falls below the predefined speed limit value for a predetermined amount of time.

5. The method of claim 1 further comprising:
ascertaining an absence of the emergency brake signal; and,
ascertaining whether the absence of the emergency brake signal is in response to an emergency brake termination signal provided by the driver assistance system for terminating emergency braking of the vehicle.

6. The method of claim 5 further comprising:
ascertaining a time span between said detecting the emergency brake signal and said ascertaining the absence of the emergency brake signal, in the event that the absence of the emergency brake signal is not in response to the emergency brake termination signal;
comparing the time span to a predefined time limit value; and,
performing at least one follow-up operation if the time span exceeds the predefined time limit value.

7. The method of claim 6, wherein the at least one follow-up operation comprises:
bringing the braking device of the braking system into the braking position for braking the vehicle to the standstill, if the standstill of the vehicle is not ascertained; and,
holding the braking device in the braking position subsequent to braking the vehicle to the standstill.

8. The method of claim 6, wherein the follow-up operation comprises bringing the braking device of the braking system into the braking position when ascertainment of the standstill of the vehicle is impossible.

9. The method of claim 1 further comprising:
detecting a drive signal subsequent to bringing the braking device of the braking system into the braking position; and,
bringing the braking device of the braking system into a driving position in response to the detection of the drive signal.

10. The method of claim 1, wherein the vehicle bus system is a CAN bus system.

11. The method of claim 1, wherein the driver assistance system is an autonomous emergency braking system of the vehicle.

12. The method of claim 1, wherein the braking device is a parking brake or a service brake of the braking system.

13. The method of claim 1, wherein the vehicle is a commercial vehicle.

14. A control unit for a vehicle having a braking system and a vehicle bus system, the control unit comprising:
a processor;
a non-transitory computer readable medium having program code stored thereon;
said program code being configured, when executed by said processor, to:
monitor signals on the vehicle bus system;
detect an emergency brake signal provided by a driver assistance system on the vehicle bus system;
ascertain whether the vehicle is at a standstill; and,
bring a braking device of the braking system into a braking position if a standstill of the vehicle is ascertained.

15. A computer program comprising instructions configured, when executed by a computing unit, to cause a control unit for a vehicle to carry out the method of claim 1 when run on the computing unit, wherein the vehicle has a braking system and a vehicle bus system.

16. A braking system for a vehicle comprising the control unit as claimed in claim 14.

17. The braking system of claim 16, wherein the vehicle is a commercial vehicle.

18. A vehicle comprising the braking system of claim 16.

19. The vehicle of claim 18, wherein the vehicle is a commercial vehicle.

* * * * *